United States Patent Office 3,510,461
Patented May 5, 1970

3,510,461
TERPENE CONTAINING POLYMERS AND PROCESS THEREFOR
Bernard J. Davis, Biloxi, Miss., assignor to Reichhold Chemicals, Inc., White Plains, N.Y.
No Drawing. Filed May 29, 1968, Ser. No. 732,866
Int. Cl. C08f 15/40
U.S. Cl. 260—80.78                                   7 Claims

ABSTRACT OF THE DISCLOSURE

Thermoplastic resins are formed by copolymerization of $C_{10}H_{16}$ terpenes, either in pure form or in mixtures, with alkylidene norbornene in presence of a Friedel-Crafts catalyst at temperatures ranging from about 0°–100° C.

---

The invention relates to copolymers of an alkylidene norbornene and terpenes and to the process of making the same. More particularly, this invention relates to thermoplastic resins formed by copolymerizing an alkylidene norbornene with terpenes, and in particular to the soluble, thermoplastic resins so formed.

Polyterpene resins are noted for their characteristics of solubility, thermoplasticity and compatibility with a broad variety of other substances. The polyterpene resins are available in a broad range of softening points. Because of these characteristics and others, the polyterpene resins are ideally suited for a number of uses, as is well known.

The commercially available solid, thermoplastic polyterpenes are terpene homo and copolymers and are composed essentially of polymerized bicyclic and monocylic terpenes, predominantly beta-pinene. Other terpenes these resins may contain are for example alpha-pinene, dipentene (dl, limonene), d-limonene, terpinenes, camphene, delta carene, beta phellandrene and the like and mixtures thereof. The predominant monomeric terpenes employed are preferably alpha and beta pinene, and dipentene. Beta-pinene is by far the most efficient monomer in terms of yield and softening points obtainable, but unfortunately, beta pinene is not correspondingly the predominant terpene in turpentines, which are the most commonly available source of terpenes for the production of terpene resins. Gum turpentine, obtained from live trees is richest in beta-pinene, but increasing demand for pine lumber and increasing costs involved in bleeding the trees, as well as earlier cutting, seriously restrict the availability of gum turpentine, previously readily available and richest in beta pinene.

This means that other methods must be found to supplant diminishing beta pinene supplies order to produce the desirable high melt points and yields this monomer affords. Typical compositions of commercially available turpentines are set forth in Table I.

TABLE I

|  | Gum, percent | Refined sulfate wood, percent | Steam distilled wood, percent |
|---|---|---|---|
| Alpha pinene | 63 | 66 | 75 |
| Beta pinene | 33 | 20 | Trace |
| Dipentene | 2 | 5 | 10 |
| Other terpenes | 2 | 10 | 15 |

As is evidenced above, alpha pinene is the most abundant natural terpene in turpentine, but unfortunately, though its structure closely resembles beta pinene it is an extremely poor resin yielding monomer.

For example, when both monomers in their pure state are individually polymerized, beta pinene with the same dilution and catalyst content and reaction temperature yields about 94% polymer with a 134° C. softening point, while alpha pinene under the same conditions yields 35% resin with an 84° C. softening point. Literature and the art show that mixtures of the two monomers do not yield the final melt point and yield expected based on the beta pinene content. This evidences the fact that alpha pinene in particular has a limiting effect upon the polymerizability of beta pinene resulting in higher than usual yields of low molecular weight oily polymers that must be stripped from the final resin.

In view of the foregoing and the ever decreasing supply of pure beta pinene, there is an increasing requirement for a terpene polymerization system which would enable the resin formulator to produce high melt point resins in suitable yield from normally low yield producing monomeric terpenes.

Accordingly, among the objects of this invention are thermoplastic resins formed by the copolymerization of $C_{10}H_{16}$ terpenes, either in pure form or as mixtures, with an alkylidene norbornene such as ethylidene norbornene or methylidene norbornene. Also included within this invention is a process of preparing resins in relatively high yields and in a variety of softening points composed of copolymers of terpenes and an alkylidene norbornene, particularly high yields of various softening points wherein the terpene is predominantly alpha pinene or other normally difficultly polymerizable terpene.

Preferably the amount of $C_{10}H_{16}$ terpene used is at least 50% by weight of the combined weight of said terpene and the alkylidene norbornenes.

The alkylidene norbornenes employed in this invention are commercially produced by reacting butadiene with cyclopentadiene in one case to produce ethylidene norbornene,

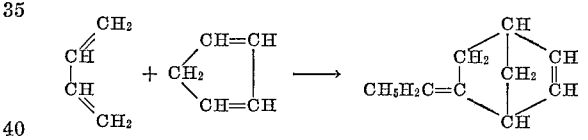

or similarly propadiene or methyl acetylene with cyclopentadiene to give methylidene norbornene. Both alkylidene norbornenes behave well in the practice of this invention, but ethylidene norbornene is preferred because of lower cost.

Since ethylidene norbornene is preferred for the reason stated, later references to it in this application are denoted by the descriptive initials (EN).

The ethylidene norbornene-terpene copolymer resins of this invention are thermoplastic and exhibit a softening point higher than that obtainable from the terpene involved under the same conditions.

The softening points of the resins obtained are directly related to the proportion of ethylidene norbornene employed with the terpene. There is an apparent maximum proportion of ethylidene norbornene that can be employed with each individual terpene to afford resins soluble in aliphatic solvents. In fact, gel-like insoluble polymers will form when this proportion is exceeded even if the reaction is run in an aromatic solvent like xylene. This threshold value is characteristic of each monomeric pure terpene and is inversely proportional to their normal reactivity when classed by normal yield and melt point. In other words beta pinene will tolerate much less modification with ethylidene norbornene to provide a soluble resin than will alpha pinene. This threshold can easily be detected on filtration of the neutralized reaction mixture. In those cases where the value has been exceeded, filtration is slow to impossible because of gel formation.

The maximum threshold limits for the following pure terpenes have been determined during the course of a large number of experimental polymerizations. They are as follows:

Pure monomer:                 Bicyclononadiene, mole
- 1 mole beta pinene _____ 1/8
- 1 mole d,l limonene _____ 1/4
- 1 mole 3, limonene _____ 1/3
- 1 mole beta phellandrene _____ 3/16
- 1 mole alpha pinene _____ 1/2

It was found that the threshold value remains the same for the most reactive monomer in a given mixture. An amount acceptable to a less reactive monomer in a mixture results in gelation since the quantity of ethylidene norbornene employed was in excess of the limit for the more reactive monomer present. In other words, a 50/50 mixture of beta-pinene and alpha-pinene can only tolerate 1/8 mole ethylidene norbornene based on the beta pinene present and not the 5/16 mole that might be expected.

The resins of this invention include copolymers of terpenes and ethylidene norbornene which are polyterpene-like in character, primarily with respect to the solubility, compatibility and thermoplasticity characteristics of the presently commercially available polyterpenes.

As a general procedure the ethylidene norbornene and the terpene are premixed in the desired ratio. They are added slowly to a cooled reaction medium consisting of a suitable solvent and the catalyst at such a rate so as to maintain the desired temperature of reaction. The solvent can be aliphatic, aromatic or mixtures thereof, or a chlorinated hydrocarbon. The catalyst can be aluminum chloride, aluminum bromide, or any acid reacting metal halide suitable as a Friedel Crafts catalyst or phosphorous pentafluoride or boron trifluoride or any suitable complexes of these two gases. For practice of this invention aluminum chloride is preferred. It can be employed at a rate of 1–10% based on the weight of the reactive monomers.

Higher melt points can be obtained by slowly and carefully adding the catalyst to all of the monomer previously diluted with the reaction medium solvent. For most cases a dilution of 35–50% monomer is easiest to control though the concentration of monomer may vary from 10–90%, given suitable cooling or handling facilities.

The reaction can be run at temperatures ranging from about 0° C. to about 100° C. but the range from about 20° C. to about 65° C. is suitable and a range of from about 25° C. to about 45° C. is desirable, and ranges of from about 25° C. to about 35° C. or from about 30° C. to about 45° C. provide highest yields with minimum color.

The reaction time covering the time of addition of monomer or catalyst requires one hour. The reaction mass is then held for 1½ hours at room temperature. The product can then be quenched in water with subsequent separations and washings to remove the catalyst or as we prefer, treat the reaction mixture with lime and attapulgus clay (supplied by Minerals & Chemicals Phillip Corp., Menlo Park, N.J.) employing 2½ times the amount of catalyst of each of these materials. After addition of the clay and lime, the mixture is heated to 90° C., filtered and then inert gas sparged to 220° C., steam sparged to 235° C. and held at this temperature until the ratio of condensed water to oil coming over is 9.8 to 0.2. The final resin is then poured.

In order that those skilled in the art may better understand this invention, the following examples are given which are illustrative of the preparation of the invention but are not intended for purposes of limitation.

EXAMPLES

The resins produced and the conditions of the reactions are summarized in Table II. In those cases where addition is denoted as direct, the catalyst was added to the monomer-diluent; where denoted indirect the monomer was added to the diluent-catalyst.

TABLE II

[Direct addition]

| Example | Terpene | Moles in reaction | | Solvent | Catalyst | Reaction time, hrs. | Reaction temp., °C. | Hold time, hours | Yield, percent | Softening point, °C. |
|---|---|---|---|---|---|---|---|---|---|---|
| | | Terpene | EN | | | | | | | |
| 1 | Beta pinene | 1 | 1/8 | Xylene | AlCl₃ | 1 | 25–30 | 1½ | 103 | 155 |
| 2 | do | 1 | 1/8 | Heptane | AlCl₃ | 1 | 25–30 | 1½ | 100 | 150 |
| 3 | do | 1 | 1/8 | Xylene | AlCl₃ | 1 | 30–35 | 1½ | 105 | 152 |
| 4 | Alpha pinene | 1 | 1/2 | do | AlCl₃ | 1 | 30–35 | 1½ | 75 | 135 |
| 5 | do | 1 | 1/4 | do | AlCl₃ | 1 | 30–35 | 1½ | 65 | 120 |
| 6 | do | 1 | 1/8 | do | AlCl₃ | 1 | 30–35 | 1½ | 55 | 105 |
| 7 | Dipentene | 1 | 1/4 | do | AlCl₃ | 1 | 30–35 | 1½ | 70 | 125 |
| 8 | B-phellandrene | 1 | 3/16 | do | AlCl₃ | 1 | 30–35 | 1½ | 90 | 140 |
| 9 | d-Limonene | 1 | 1/4 | do | AlCl₃ | 1 | 30–35 | 1½ | 80 | 130 |
| 10 | Alpha pinene / Beta pinene | 1/2 / 1/2 | 1/16 | do | AlCl₃ | 1 | 30–35 | 1½ | 90 | 145 |
| 11 | do | 1 | 1/8 | do | BF₃ | 1 | 30–35 | 1½ | 95 | 120 |
| 12 | Alpha pinene | 1 | 1/2 | do | BF₃ | 1 | 30–35 | 1½ | 70 | 110 |
| 13 | Gum turpentine | 1 | 1/24 | do | AlCl₃ | 1 | 30–35 | 1½ | 75 | 140 |
| 14 | Refined sulfate wood turpentine | 1 | 1/40 | do | AlCl₃ | 1 | 30–35 | 1½ | 80 | 138 |
| 15 | Steam dist. wood turpentine | 1 | 1/4 | do | AlCl₃ | 1 | 30–35 | 1½ | 77 | 138 |

[Indirect addition]

| Example | Terpene | Moles in reaction | | Solvent | Reaction time, hrs. | Reaction temp., °C. | Hold time, hours | Yield, percent | Soft. pt., °C. |
|---|---|---|---|---|---|---|---|---|---|
| | | Terpene | EN | | | | | | |
| 16 | Beta pinene | 1 | 1/2 | Xylene | 1 | 25–30 | 1½ | 100 | 150 |
| 17 | Alpha pinene | 1 | 1/2 | do | 1 | 25–30 | 1½ | 72 | 131 |
| 18 | do | 1 | 1/4 | do | 1 | 25–30 | 1½ | 61 | 116 |
| 19 | do | 1 | 1/8 | do | 1 | 25–30 | 1½ | 53 | 102 |
| 20 | Dipentene | 1 | 1/4 | do | 1 | 25–30 | 1½ | 68 | 121 |

While the examples shown demonstrate the optimum concentration of EN, there is no reason that lower concentrations of this monomer cannot be employed. In fact, higher concentrations can be employed if the gel is a desired product for use in such solvent free systems as rubber milling when the gel can act as a tackifier but for most purposes, where the resin solubility is a critical factor, the concentration of the EN should not exceed the previously explained threshold value.

It is obvious to those skilled in the art that other modifications and variations of the present invention are possible in the light of above teachings. It is therefore to be understood that changes may be made in the particular embodiments of the invention described which are within the full intended scope of the invention as defined by the appended claims.

What is claimed is:

1. A process of forming a thermoplastic soluble copolymer comprising reacting an alkylidene norbornene with a $C_{10}H_{16}$ terpene selected from at least one member of the group consisting of monocyclic and bicyclic $C_{10}H_{16}$ terpenes in presence of a Friedel Crafts catalyst at temperatures ranging from about 0° C. to about 100° C.

2. The process according to claim 1 wherein the amount of $C_{10}H_{16}$ terpene used is at least 50% by weight of the terpene and the alkylidene norbornene.

3. A process according to claim 1, wherein the alkylidene norbornene is at least one member of the group consisting of ethylidene norbornene and methylidene norbornene.

4. A process according to claim 1 wherein the $C_{10}H_{16}$ terpene is at least one member of the group consisting of beta pinene, alpha pinene, dipentene b-phellandrene, d-limonene, and turpentine.

5. A process according to claim 1 wherein the catalyst is aluminum chloride.

6. A process according to claim 1 wherein the temperature ranges from about 25° C. to about 35° C.

7. A thermoplastic soluble copolymer prepared according to process of claim 1.

References Cited

UNITED STATES PATENTS 3,151,173  9/1964  Nyce _____ 260—666

JOSEPH L. SCHOFER, Primary Examiner

R. S. BENJAMIN, Assistant Examiner

U.S. Cl. X.R.

260—88.2